(12) United States Patent
Pizzey

(10) Patent No.: US 6,368,650 B1
(45) Date of Patent: Apr. 9, 2002

(54) METHOD OF MANUFACTURING FULL FAT MILLED FLAX SEED PRODUCT

(76) Inventor: Glenn Roy Pizzey, Box 132, of the Rural Municipalty of Silver Creek, Angusville, Manitoba (CA), R0J 0A0

( * ) Notice: Subject to any disclaimer, the term of this patent is extended or adjusted under 35 U.S.C. 154(b) by 0 days.

(21) Appl. No.: 09/656,063

(22) Filed: Sep. 6, 2000

(51) Int. Cl.7 .................................................. A23L 1/00
(52) U.S. Cl. ........................................ 426/518; 426/629
(58) Field of Search ................................ 426/518, 629, 426/665

(56) References Cited

U.S. PATENT DOCUMENTS 4,857,326 A * 8/1989 Stitt ........................ 424/195.1
5,643,622 A * 7/1997 Sawhill ....................... 426/807

* cited by examiner

*Primary Examiner*—George C. Yeung
(74) *Attorney, Agent, or Firm*—Adrian D. Battison; Michael R. Williams

(57) ABSTRACT

The stability and shelf life of full fat milled flax seed product is increased by selecting for the supply for milling flax seeds based upon the criterion that the flax seeds contain no more than 5% of flax seeds which are distinguished from the remainder of the seeds by visually distinguishable a darker color. The supply can be brought to the required level of the darker seeds by extracting the darker seeds using an extraction method based upon a detection of the color.

2 Claims, No Drawings

METHOD OF MANUFACTURING FULL FAT MILLED FLAX SEED PRODUCT

The present invention relates to full fat milled flax seed and particularly to a method of forming the product which enhances stability and shelf life.

BACKGROUND OF THE INVENTION

Flax has been used as a food product for many centuries and has in recent years received increasing attention in view of its particular nutrition properties.

The milling of flax into flour is also of course well known and has been widely used. One problem with flax flour and particularly full fat milled seed has however been its limited stability and shelf life by which the flour and products manufactured from the flour can degrade to such an extent that the product becomes of limited use or unusable.

There has therefore been ongoing concerns with and attention to improving the shelf life of the product. It has been previously established that increased values of the following four measurements of Lipid Peroxides, malonaldehyde, alkenals and free fatty acids of the components of the product are indicative of the gradual degradation of the product over time.

It is further well known that the use of green or partly green seeds, generally caused by harvesting the seeds while immature, can lead to reduced quality of certain seed products. Thus a supply of the seed containing high numbers of green seeds is well known to provide a reduced quality of the seed so that generally the seed of such poor quality receives a lower price. The immature seeds generally have a lower density and therefore can often be sorted so as to be extracted from the mature seeds using techniques responsive to the differing densities of the mature and immature seeds.

Canadian and American standards for flax seed quality therefore often designate that samples containing higher quantities of immature seeds are unacceptable for many end uses.

Even however taking into account the removal or reduction of immature seeds, there remains an important objective to further improve the stability and shelf life of the full fat milled flax seed product for improved quality of supply to the end user.

Full fat milled seed is defined as the product milled by any suitable milling process including grinding and impact techniques where the whole seed is milled without any prior extraction of oil or other component.

SUMMARY OF THE INVENTION

It is one object of the present invention to provide a method for improving the stability and shelf life of full fat milled flax seed product.

According to one aspect of the invention there is provided a method of manufacturing full fat milled flax seed comprising:

providing a supply of flax seed;

milling the flax seeds into a flour; and increasing the stability and shelf life of the flour by selecting for the supply flax seeds based upon the criterion that the flax seeds contain no more than 5% of flax seeds which are distinguished from the remainder of the seeds by visually distinguishable a darker color.

According to a second aspect of the invention there is provided a method of manufacturing full fat milled flax seed product comprising:

providing a supply of flax seed;

milling the flax seeds into a flour; and increasing the stability and shelf life of the flour by extracting from the supply of flax seeds those seeds which are distinguished from the remainder of the seeds by a visually distinguishable darker color to provide a level of distinguished seeds in the supply which is less than 5%.

DETAILED DESCRIPTION

The stability and shelf life of Flax flour is improved by using a supply of flax seeds which has a content of visually distinguishable darker color seeds which is less than five percent.

The above content of darker seeds can be obtained by an initial selection of seeds so as to discard those bulk supplies of seeds which have a content of darker seeds greater than the required content.

Alternatively the content of darker seeds can be reduced from an initial level above the required content by a separation method which detects the darker seeds and expels those darker seeds. Thus a supply which initially contains a level of darker seeds more than the required amount can be improved to a supply which is within the target amount.

The quantity of darker seeds can be tested simply by obtaining a sample of the seeds at a predetermined weight, by spreading the sample over a sheet of a suitable color for example white and by visually determining those seeds which are visually distinguishable from the remaining seeds by way of a color which is darker than the remaining seeds. Thus any seed which can be visually determined to have a darker color is removed and placed in a separate container so as to determine the total proportion of the darker seeds relative to the seeds of equal color.

The color of flax seeds does itself vary from golden brown through to a dark red brown. However these color differences are generally caused by differences in growing conditions so that any single supply of the seeds from a single source will have seeds which have the same growing conditions and thus are substantially identical in color so that each seed is not visually distinguishable from the next seed by way of color. Some of the seeds however, despite the same growing conditions, have a darker color which is sufficiently different in darkness so as to be visually distinguishable. All of these seeds are extracted from a sample and the total weight counted relative to the weight of the sample. Only a distinction by way of visible difference in color is used as the distinguishing criterion.

Some of the seeds are immature seeds which have a green color and these are extracted also since they are also visually distinguishable in color from the remaining alike seeds. Other seeds which are darker than the remaining seeds are not immature but have a coloring which is caused by the growing process. The darker seeds which are not immature seeds are generally not distinguishable by way of density and hence must be extracted solely by way of the visual distinction.

The maximum allowable content percentage of five percent has been found by trials to provide a significant improvement in shelf life as discussed in more detail herein after while allowing an economic selection of a suitable supply. Thus a content of darker seeds of zero percent would provide a yet further advantage but is economically unacceptable in view of the fact that it is difficult and expensive to obtain such a supply. From a practical point of view, therefore, the amount selected of five percent is a reasonable compromise between the improvement that is obtained in the stability and shelf life relative to an economically viable commercial supply.

A suitable separation technique by color sorting is commercially available and can be used. These particular machines employ various spectrums of light, optical scanners and mechanical processes to differentiate and separate the seed. Such machines are available to one skilled in the art and therefore no further description is necessary. Again the machine could be operated to reduce the quantity of darker seeds to a percentage less than the above amount but the economic operation of this machine to obtain such a supply is discretionary provided the content is brought down to a level below 5 percent by weight.

It will be appreciated that the extraction of the selection of supplies having reduced quantities of darker seeds is not for reason of aesthetics, particularly bearing in mind that the seeds are all ground or mauled into flour so that the darker seeds will no longer be individually visible.

However it has been determined by extensive testing that the use of flax seeds having the above characteristics provides improved stability and shelf life. The reason for this improvement is not presently understood. However it has been determined that initial quantities of seed when tested with and without the darker components provides significantly higher levels of the factors as set forth herein after for the supplies including the darker seeds.

Thus the test results set out below show that measurements of the following four components taken after as short a time as three months of storage are higher by the factor stated for product having a dark seed content greater than 5% than they are for product according to the present invention:

Lipid peroxides—126% higher

Free fatty acids—28.5% higher

Malonaldehyde—222% higher

Alkenal—226% higher

It has further been shown that the above components increase more rapidly due to degradation particularly by oxidation, during storage of the flour after milling.

In the trial set forth above, the acceptable seed in accordance with the present invention had 2% discoloured seeds and the unacceptable product providing the above higher measured levels had 9% discolored seeds.

Further extensive trials have established that the stated level of 5% according to the present invention will reliably correlate to product that will, when processed to produce a full fat milled flax seed product according to the present invention, produce values below the following cut off values:

| | |
|---|---|
| Lipid peroxides | 5 meq/kg of oil |
| Free fatty acids | 2% oleic acid in sample |
| Malonaldehyde | 30 nmol/ml of sample |
| Alkenals | 300 nmol/ml of sample |

The extensive trials have shown that the above values represent measurable parameters by which stability and shelf life can be reproducibly predicted.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

What is claimed is:

1. A method of manufacturing full fat milled flax seed product comprising:

providing a supply of flax seeds;

milling the flax seeds into a full fat milled flax seed product; and increasing the stability and shelf life of the full fat milled flax seed product by selecting for the supply flax seeds based upon the criterion that the flax seeds contain no more than 5% of flax seeds which are distinguished from the remainder of the seeds by visually distinguishable a darker color.

2. A method of manufacturing full fat milled flax seed product comprising:

providing a supply of flax seeds;

milling the flax seeds into a full fat milled flax seed product; and increasing the stability and shelf life of the full fat milled flax seed product by extracting from the supply of flax seeds those seeds which are distinguished from the remainder of the seeds by a visually distinguishable darker color to provide a level of distinguished seeds in the supply which is less than 5%.

* * * * *